United States Patent [19]

Rosback et al.

[11] 3,929,669

[45] Dec. 30, 1975

[54] METHOD FOR MANUFACTURING AN ADSORBENT USEFUL FOR OLEFIN SEPARATION

[75] Inventors: Donald H. Rosback, Elmhurst; Richard W. Neuzil, Downers Grove, both of Ill.

[73] Assignee: Universal Oil Products Company, Des Plaines, Ill.

[22] Filed: Dec. 22, 1972

[21] Appl. No.: 317,861

[52] U.S. Cl............... 252/455 Z; 208/310; 423/112
[51] Int. Cl.$^2$..................... B01J 29/06; C10G 25/00
[58] Field of Search................. 252/455 Z; 208/310; 423/112

[56] References Cited
UNITED STATES PATENTS

| | | | |
|---|---|---|---|
| 3,382,039 | 5/1968 | Calmon et al. | 423/112 |
| 3,549,558 | 12/1970 | Berry et al. | 252/455 Z |
| 3,558,730 | 1/1971 | Neuzil | 260/674 SA |
| 3,663,165 | 5/1972 | Haden, Jr. et al. | 423/112 |

*Primary Examiner*—Carl F. Dees
*Attorney, Agent, or Firm*—James R. Hoatson, Jr.; Robert W. Erickson; William H. Page, II

[57] ABSTRACT

A process for the production of a type X structured crystalline aluminosilicate adsorbent useful in the separation of olefins from a hydrocarbon mixture comprising olefins and paraffins. The process basically comprises contacting a precursor mass containing type X structured crystalline aluminosilicate and amorphous material as a binder with an aqueous caustic solution to effect the addition of alkali metal cation to the crystalline structure thereby producing an adsorbent which has both increased capacity for olefins and decreased catalytic activity.

6 Claims, No Drawings

METHOD FOR MANUFACTURING AN ADSORBENT USEFUL FOR OLEFIN SEPARATION

BACKGROUND OF THE INVENTION

1. Field of the Invention

The field of art to which this invention pertains is crystalline aluminosilicate production. More specifically this invention relates to a process for modifying the characteristics of a precursor mass comprising type X zeolite and amorphous binder to produce an adsorbent having characteristics desirable for use as an adsorbent for separating olefins from a hydrocarbon feed mixture containing olefins.

2. Description of the Prior Art

The treating of crystalline aluminosilicates with a caustic solution to modify certain of its properties has been recognized in the prior art. U.S. Pat. No. 3,326,797, for example, discloses a process for aqueous caustic treating of high silica zeolites having silica over alumina ratios between about 6 and 12, at treating conditions, for the sole purpose of removing a certain percentage of structural silica from the zeolite. The caustic treatment, at conditions to preferably retain a final $SiO_2/Al_2O_3$ ratio greater than about 5.5, is found to increase the adsorptive capacity of the zeolite and to increase its catalytic activity. The caustic treating process of that reference patent is concerned only with etching or leaching of silica from the zeolite structure to achieve these characteristics and neither discloses nor suggests the addition of alkali metal cations to the zeolite structure during the treating process for any reason whatever.

We have discovered that treating a precursor mass comprising amorphous material as binder and a low silica zeolite having a silica over alumina ratio of about 2.5 with an aqueous caustic solution will increase the zeolite capacity for olefins and will also decrease rather than increase the catalytic activity of the zeolite. Furthermore, we have found that catalytic activity of the finished adsorbent decreases in proportion to the amount of the cation added to the zeolite by the caustic treatment. The cation added by the ion exchange apparently replaces acid sites within the zeolite that catalyze isomerization and polymerization reactions. A particular problem encountered when using an adsorbent comprising type X zeolite without treatment to separate olefins from a hydrocarbon feed mixture is that the adsorbent catalyzes isomerization and polymerization of the feed olefins. Polymer produced blocks the pores of the adsorbent thereby reducing the effectiveness of the adsorbent.

By the process of our invention an adsorbent especially suited for olefin separation is produced having both increased capacity for olefins and decreased catalytic activity. The adsorbent produced is more efficient for olefin separation because of its increased capacity and has a longer effective life because of its reduced catalytic activity.

SUMMARY OF THE INVENTION

The invention can be summarized as encompassing both a method for the manufacture of an adsorbent having both increased capacity for olefins and decreased catalytic activity and an improved adsorptive process for the separation of olefins from a hydrocarbon feed mixture comprising olefins and saturates. The adsorbent manufacturing method broadly comprises the steps of: contacting a precursor mass comprising type X zeolite with an aqueous caustic solution to effect the addition of alkali-metal cation to the zeolite structure, washing the mass of aluminosilicate with water to remove excess caustic solution and, at least partially dehydrating the washed adsorbent. The improved olefins separation process comprises the steps of: contacting a hydrocarbon feed mixture which comprises olefins and saturate with a bed of zeolite adsorbent at adsorption conditions to effect the selective retention of olefins by the adsorbent; withdrawing from the bed of adsorbent a raffinate stream comprising less selectively retained hydrocarbons; contacting the adsorbent bed with a desorbent material at desorption conditions to effect desorption of the olefins from the adsorbent; and, withdrawing a stream containing olefins and desorbent from the bed of adsorbent wherein the improvement comprises employing the adsorbent prepared by the method of this invention.

DESCRIPTION OF THE INVENTION

Since the anticipated use for the adsorbent prepared by the method of this invention is in various processes for the separation of olefinic hydrocarbons from a feed mixture containing olefinic and saturated hydrocarbons, the particular usefulness of this adsorbent and general insight into its desirable characteristics may be better understood by brief reference to those processes.

In separating the olefinic hydrocarbon from the feed mixture, the feed is contacted with a bed or beds of the type X structured zeolite adsorbent and the olefinic hydrocarbon is selectively retained by the adsorbent while the unadsorbed or raffinate mixture which comprises saturated hydrocarbons is removed from the interstitial void spaces between the particles of adsorbent and the surface of the solid adsorbent. The adsorbent is then contacted with a desorbent material which is capable of displacing the adsorbed olefinic hydrocarbons from the adsorbent.

The adsorbent can be contained in a single chamber where through programmed flow into and out of the chamber, separation of the olefinic hydrocarbons is effected. Processes employing swing-bed operational techniques, where a series of adsorbent chambers are available, or simulated moving-bed countercurrent operations similar to those generally disclosed in the pattern of operations, as disclosed in U.S. Pat. No. 2,985,589, can use the adsorbent prepared by the method of this invention.

A particularly preferred process to use the adsorbent of this invention is a continuous process for the separation of olefins from a hydrocarbon feed mixture comprising olefins and saturates which process comprises the steps of: contacting the feed mixture with the adsorbent at adsorption conditions to effect the selective retention of the olefins by the adsorbent, withdrawing from the bed of adsorbent a raffinate stream comprising less selectively retained hydrocarbons, contacting the adsorbent with a desorbent material at desorption conditions to effect desorption of the olefins from the adsorbent, and withdrawing a stream containing olefins and desorbent from the adsorbent. The longer useful life of our adsorbent would be an improvement to such processes as this one in which a regeneration step is not included in the normal sequence of operations.

Preferred operating conditions of this particular process include a temperature within the range of from about 25°C. to about 150°C. and a pressure within the range of from about atmospheric to about 500 psig. Furthermore, both adsorption and desorption of the olefins are effected at conditions selected to maintain liquid phase throughout the bed of adsorbent.

The adsorbent produced by the method of this invention may of course be used in other selective adsorption processes for separating olefins. These might include, for instance, swing-bed processes in which both adsorption and desorption are conducted the vapor phase or in which one operation is conducted in the vapor phase and the other in the liquid phase. Operating pressures and temperatures for adsorption and desorption might be the same or different.

Charge stocks which may be used in the above or other selective adsorption process contain olefins in the $C_{10}$–$C_{20}$ carbon range. Of these olefins, the $C_{10}$–$C_{15}$ range is particularly preferred. The $C_{10}$–$C_{15}$ normal mono-olefins are generally produced by catalytically dehydrogenating a $C_{10}$–$C_{15}$ normal paraffin stream. The effluent stream from a dehydrogenation process generally contains about 5 to 25% olefins and may require further processing in order to concentrate the normal olefinic hydrocarbons.

A typical example of the composition of the effluent stream from a dehydrogenation process is shown below in Table 1:

TABLE 1

DEHYDROGENATION REACTOR EFFLUENT ANALYSIS BY GAS-LIQUID CHROMATOGRAPHY

|  | Wt.% |
|---|---|
| n-$C_{10}$ paraffin | 0.1 |
| n-$C_{11}$ paraffin | 24.9 |
| n-$C_{11}$ olefin | 1.8 |
| n-$C_{12}$ paraffin | 27.8 |
| n-$C_{12}$ olefin | 2.6 |
| n-$C_{13}$ paraffin | 22.6 |
| n-$C_{13}$ olefin | 2.7 |
| n-$C_{14}$ paraffin | 12.1 |
| n-$C_{14}$ olefin | 1.7 |
| n-$C_{15}$ paraffin | 0.4 |
| Total non-normals | 3.3 |
| TOTAL | 100.0 |
| Total non-normals | 8.8 |
| Total normal olefins | 87.9 |
| Total normal paraffins | 3.3 |
| TOTAL | 100.0 |
|  | Vol.% |
| Total olefins | 9.8 |
| Light ends | 0.2 |
| Total paraffins | 86.5 |
| Total non-normals | 3.5 |
| TOTAL | 100.0 |

The 3.5 volume percent non-normals in the above analysis are primarily aromatics. Another possible charge stock for the process would be a selected fraction from a gasoline produced by a fluid catalytic cracking unit. A typical analysis, from a 95°C. cut of such gasoline is as follows:

|  | Vol.% |
|---|---|
| Olefins | 25.4 |
| Paraffins and naphthenes | 72.3 |
| Aromatics | 2.3 |
|  | 100.0 |

The desorbents which can be used in processes employing this adsorbent will vary depending on the type of operation employed. In the swing bed system in which the preferably adsorbed olefins are removed from the adsorbent by a purge stream, gaseous hydrocarbons or other type gases may be used at elevated temperatures or reduced pressures or both to effectively purge adsorbed olefins from within the sorbent. However, in other type operations which are generally operated at substantially constant pressures and temperatures, the desorbent relied upon must be judiciously selected in order that it may displace the preferred olefin adsorbed from the feed within the adsorbent without unduly preventing the feed olefins from displacing the desorbent in a following adsorption cycle. In cases where liquid phase, substantially isothermal and constant pressure operations are effected, it is preferred to use an olefinic or aromatic desorbent. The desorbent may be either a normal mono-olefin or a branched chain mono-olefin.

With the type of processes employing adsorbents to separate olefins now in mind, one can appreciate that certain characteristics of adsorbents are highly desirable, if not absolutely necessary, to the successful operation of the selective adsorptive process. Among such characteristics are: adsorptive capacity for some volume of desired olefins per volume of adsorbent; reduced or eliminated catalytic activity for undesired side reactions such as polymerization and isomerization; and selectivity of adsorption both for olefins and for the desired carbon number range of olefins.

Capacity of the adsorbent for adsorbing a specific volume of olefins is of course a necessity; without such capacity the adsorbent is useless for adsorptive separation. Furthermore the higher the adsorbent's capacity for the species to be adsorbed, the better is the adsorbent. Increased capacity of a particular adsorbent makes it possible to reduce the amount of adsorbent needed to separate the desired species contained in a particular rate of hydrocarbon feed mixture. A reduction in the amount of adsorbent required for a specific adsorptive separation reduces the cost of the separation process. It is important that the good initial capacity of the adsorbent be maintained during actual use in the separation process over some economically desirable life.

For this reason, and others, it is necessary that the adsorbent possess little or no catalytic activity which would produce products that might degrade adsorbent capacity or selectivity. It is additionally important that the highly reactive olefins are not reacted into side products which either degrade the product quality or reduce the overall yield of concentrated olefins. In instances where the feed streams include both normal and isomeric olefin hydrocarbons, the isomerization effects of the adsorbent are not a great impediment to the process economics where the prime consideration is the concentration of olefinic product streams. However, reduction of the polymerization activity of an adsorbent is very important. The polymerization, in addition to reducing the yields of olefinic hydrocarbons also, as mentioned above, tends to degrade the adsorbent. The polymerization effects are generally considered to be primarily physical impediments which can prevent the olefinic hydrocarbons from passing into the molecular sieve adsorbent by plugging up the surface of the adsorbent and the pores present in the structure of the adsorbent. This shortens the useful life of the adsorbent and makes necessary frequent regeneration treatments to restore the adsorptive properties of the adsorbent.

In instances where a particular isomer of a normal olefinic hydrocarbon is desired to be separated from a feed stream which contains primarily a single olefinic isomer, the isomerization activity of the adsorbent becomes an equal if not greater problem than the polymerization activity. Since both reactions seem to occur at the same time, the term "catalytic activity" as used herein shall mean both isomerization and polymerization activity. It is, therefore, extremely important that the catalytic activity be substantially reduced or preferably totally eliminated by proper methods of manufacture of a selected adsorbent.

While reducing the temperature of the operations of the adsorption process in which the catalytic activity is present will substantially reduce the catalytic activity because of the associated reduction in the rate of reaction, this procedure in adsorptive separation processes employing molecular sieves, in most cases, is not desirable because the reduction in temperature also reduces the kinetic energy of the materials passing into and out of the adsorbent. This substantially reduces the rate of exchange of feed olefins into and out of the adsorbent giving what is considered in the art as poor breakthrough fronts which results in product contamination with feed stock and relatively high requirements of adsorbent for a given throughput of olefin-containing feed stock.

The other important adsorbent characteristic is the ability of the adsorbent to separate components of the feed; or, in other words, the selectivity, (B), of the adsorbent for one component as compared to another component. Selectivity is expressed not only for the desired hydrocarbon type (olefins) as compared to undesired hydrocarbons but is also expressed between homologs of the desired hydrocarbon type. The selectivity (B) as used throughout this specification is defined as the ratio of the two components of the adsorbed phase over the ratio of the same two components in the unadsorbed phase at equilibrium conditions.

Selectivity is shown as Equation 1 below:

$$\text{Selectivity} = (B) = \frac{[\text{vol. percent } C/\text{vol. percent } D]A}{[\text{vol. percent } C/\text{vol. percent } D]U} \quad (\text{Eq. 1})$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is a preferential adsorption of one component by the adsorbent. As the (B) becomes less than or greater than 1.0 there is a preferential selectivity by the adsorbent of one component. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The adsorbent produced by the method of this invention has good capacity and selectivity for olefins and little or no catalytic activity thereby making it particularly effective for use in a process for the separation of olefins.

In order to test various adsorbents to measure the characteristics of adsorptive capacity, selectivity, and degree of catalytic activity, a dynamic testing apparatus was employed. The apparatus used consisted of an adsorbent chamber of approximately 40 cc. volume having inlet and outlet portions at opposite ends of the chamber. The chamber was contained within a temperature control means and, in addition, pressure control equipment was used to operate the chamber at a constant predetermined pressure. Attached to the outlet line of the chamber was chromatographic analysis equipment which was used to analyze the effluent stream leaving the sorbent chamber.

The actual operations used to determine the adsorbent capacity were as follows. A feed mixture containing at least one adsorbable component in a dilute component was passed through the adsorbent bed until the effluent stream leaving the adsorbent chamber, as measured by the chromatograph, was essentially the same composition as the feed stream passing into the inlet of the sorbent chamber. Generally the adsorbable component used in the feed mixture is decene 1. This indicates that the sieve has reached equilibrium, that is, the adsorbent was no longer adsorbing materials from the external phase and that there was no longer a net transfer of the material between the adsorbed phase and the external phase.

A desorbent mixture, containing an adsorbable component different from that of the feed, in a diluent component, was then passed into the adsorbent chamber at conditions to effect desorption of the previouslly adsorbed feed mixture component. Octene-1 is usually used as the absorbable component in the desorbent mixture. The desorbent mixture was continuously passed into the adsorbent chamber until the effluent material, as monitored by the chromatographic equipment was substantially identical to the desorbent feed material, indicating that equilibrium conditions has been achieved. Knowing the flow rate to the chamber and the effluent composition as continuously monitored by the chromatograph, the total amount of the components adsorbed by the adsorbent from the desorbent mixture can be calculated.

In order to determine the adsorptive capacity of the sieve for components in the feed mixture, the inlet stream to the chamber was then switched from the desorbent mixture back to the feed mixture to allow feed components to displace the previously adsorbed components from the desorbent mixtures. Again using the chromatograph and knowing the flow rate and effluent composition, the volume of feed components absorbed can be calculated.

Selectivity can then be calculated using the previously mentioned equation for selectivity and the capacities determined above.

In measuring the polymerization activity of the type X adsorbent, the same gas chromatographic equipment and testing apparatus was used. Two variations of the polymerization test can be used. In the first variation, the degree of catalytic activity may be measured by the loss of a known concentration of feed olefin as detected in the effluent stream by the chromatographic equipment. The measure of polymerization is then an indirect determination, being related to the difference between the inlet and outlet olefin concentrations. This catalytic activity is thought to be primarily due to polymerization reactions of the feed olefins with a small part of the feed olefins that are isomerized to other internal olefinic isomers. The relative activity scale used to express the catalytic activity of the absorbent is determined by measuring the peak height on the chromatograph equivalent to the inlet concentration of olefin as indicative of a zero catalytic activity. Hence, if the peak height of the olefins present in the effluent is same as the peak height of a known concentration of olefins present in the feed the relative absorbent activity is zero. An effluent peak height equal to one half that of the feed would represent exactly 50% polymerization or isomerization of the feed olefin component. The adsorbent activity would therefore be 50%. Equation 2 below represents the formula used to determine catalytic activity of an absorbent knowing the peak height of the olefins remaining in the effluent stream leaving the adsorbent chamber and the peak height of the olefins present in the feed.

$$\text{Adsorbent Activity} = 100 - 100 \frac{(Pe)}{(Pf)} \qquad \text{(Eq. 2)}$$

where Pe represents the peak height of the effluent olefins and Pf represents the peak height of the feed olefins.

The second variation of the catalytic activity test is to measure the polymer formed directly in the effluent stream with the chromatographic equipment. This method depends upon selecting a feed olefin, such as diisobutylene, that easily forms an identifiable polymer. The dimer peak height above the base line is then used as the measure of polymerization and catalytic activity is reported as dimer units. Both test variations can be used with the second method being the more sensitive in determining catalytic activity.

The crystalline aluminosilicate contained in the starting material used in the process of this invention is generally referred to in the art as a type X structured zeolite and has the general empirical formula as shown in Equation 3 below:

EQUATION 3

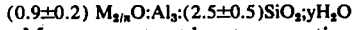
(0.9±0.2) M$_{2/n}$O:Al$_2$:(2.5±0.5)SiO$_2$:yH$_2$O where M represents at least one cation having a valence of not more than 3, n represents the valence of M, and y is a value up to about 8 depending upon the identity of M and the degree of hydration of the crystal. The cation "M" may be one or more of a number of cations such as the hydrogen cation, the alkali metal cations, or the alkaline earth cations or other selected cations. The type X zeolite is specifically disclosed in U.S. Pat. No. 2,882,244 and in that reference patent the composition of a type X zeolite is shown along with the various methods of manufacturing it.

The starting material which is used in the process of this invention for the manufacturing of an adsorbent particle is referred to in this specification as a precursor mass and comprises the type X crystalline aluminosilicate and a portion of amorphous material. The crystalline aluminosilicate material can be present in concentrations ranging from about 80% to about 98% of the weight of the precursor mass based on volatile free composition. Volatile free compositions are generally determined after the precursor mass has been calcined at 900° C. in order to drive off all volatile matter. The remaining material in the precursor mass generally comprises amorphous silica or alumina or both which is present in intimate mixture with the small particles of the zeolite material. This amorphous material may be an adjunct of the manufacturing process for the type X zeolite (for example, intentionally incomplete purification of the type X zeolite during its manufacture) or it may be added to relatively pure type X zeolite to aid in extrusion or pelleting of the zeolite.

A particularly preferred starting material is nominal 1/16 extrudate comprising 13X zeolite and a minor amount of amorphous material as binder. This zeolite is primarily in the sodium form; that is, the cation represented as "M" in equation 3 above is primarily sodium. By chemical analysis the Na$_2$O/Al$_2$O$_3$ ratio is less than about 0.7 and is typically about 0.6 or less which, it should be noted, is less than the 0.9±0.2 indicated in equation 3 above. Other cations present, primarily as impurities, typically include H+ and any of the Group IIA metal cations. It is believed that the presence of H+ is the primary cause of the catalytic activity possessed by this starting material. The silica to alumina ratio of this starting material by X-ray determination is about 2.5 and the same ratio by chemical analysis is about 2.6. Normally the starting material whether in the extrudate of pellet form is granulated to a particle size range of about 16-40 mesh (Standard U.S. Mesh) before the caustic treatment step is begun. This is approximately the desired particle size of the finished adsorbent.

The caustic treatment step is primarily an ion exchange step in which sodium cations replace non-sodium cation impurities in the zeolite-containing starting material thereby reducing or eliminating the catalytic activity of the zeolite. Although mild ion exchange conditions are employed, this step additionally removes a small amount of silica or silica and alumina thereby increasing the capacity of the material for olefins. Total silica and alumina removal from the precursor mass is from about 1 to about 15% and is generally in the range of 5 to 15%. Further evidence of this is the increase in the percent zeolite, (as determined by X-ray analysis) and surface area and also the slight reduction in the SiO$_2$/Al$_2$O$_3$ ratio of the starting material. The silica or silica and alumina removed is thought to be primarily a portion of the amorphous binder whether silica or alumina or both, in the precursor mass, as evidenced by the closer agreement of the SiO$_2$/Al$_2$O$_3$ ratio of the finished absorbent as determined by both chemical analysis and by X-ray.

We have found not only that this ion exchange step significantly reduces catalytic activity but specifically that the amount of activity reduction is proportional to the amount of sodium cation contained by the finished adsorbent. This relationship, with the amount of sodium expressed as the ratio Na$_2$O/Al$_2$O$_3$, is indicated in Table 2 below. Catalytic activity for the 13X starting material and the various absorbents was determined using the more sensitive of the activity tests previously described.

Table 2

Relationship Between Na₂O/Al₂O₃ and Catalytic Activity

| Adsorbent | Na₂O/Al₂O₃ | Catalytic Activity (Dimer Units) |
|---|---|---|
| 13X starting material | .61 | 55 |
| A | .78 | 4.5 |
| B | .81 | 3.75 |
| C | .83 | 2.35 |
| D | .85 | 2.05 |
| E | .88 | 1.10 |
| F | .91 | 0 |

As shown in the table, catalytic activity decreases with increasing sodium ion content from an unacceptable 55 dimer units of the starting material to about zero as the $Na_2O/Al_2O_3$ ratio approaches 1. For an acceptable adsorbent it is preferred that the $Na_2O/Al_2O_3$ ratio of the final product be greater than about 0.70.

Ion exchange conditions should be so regulated to achieve this desired degree of ion exchange. The degree of ion exchange achieved is a function of the three variables of caustic concentration, temperature at which the ion exchange is conducted, and the length of time the ion exchange is continued.

The ion exchange solutions employed herein are preferably composed essentially of alkali metal hydroxides, preferably sodium hydroxide, dissolved in water. Suitable concentrations to obtain the desired ion exchange can be from about 0.5 to 10% by weight of the alkali metal hydroxide with the preferred concentration being from about 0.5 to 5% by weight. By using solutions of these concentrations, the desired ion exchange can be obtained at temperatures from about 50° to 300° F. with temperature from about 150° to 250° F. being preferred. Operating pressure is not critical and need only be sufficient to insure a liquid phase. Operating pressures can range from about atmospheric pressure to about 100 psig. The length of time required for the ion exchange will vary depending upon the solution concentration and temperature from about 0.5 to 5 hours. At the above preferred concentration and temperatures, a contact time which has been shown to be specially preferred is about 2 to 3 hours. The ion exchange step should be controlled so that the zeolite structure will not be destroyed and so that the final product will have a $Na_2O/Al_2O_3$ ratio greater than about 0.7.

The next step in the method of manufacture of this invention is the washing step for the purpose of removing excess alkali metal hydroxide solution remaining within the ion-exchange adsorbent mass. The washing medium is water which has a pH within the range of 7 to 10 and preferably within the range of 9 to 10. If necessary the water is adjusted to and maintained at the desired pH by adding alkali metal hydroxide. Since the primary purpose of the ion exchange was to remove hydrogen cation (and metal cation) contaminates, this pH range is necessary to avoid redepositing hydrogen cation on the adsorbent mass. Washing temperatures can include temperatures within the range of about 100° F. to about 200° F. with a temperature of 135° F. to 145° F. preferred. Although the washing step can be done in a batch manner with one aliquot of wash water at a time, the washing step is generally and preferably done on a continuous flow type basis with water passed through a bed of the adsorbent at a given liquid hourly space velocity and a temperature for a period of time in order that from about 1 to about 5 gallons of water per pound of starting material is used to wash the material. Preferred washing conditions include using liquid hourly space velocities from about 0.5 to about 5, with 1.5 being preferred, to pass from about 1 to about 3 gallons of wash water per pound of starting material over the ion exchanged adsorbent. A good indication of complete washing is made by measuring the pH of the effluent wash water and comparing it to the pH of the fresh feed wash water. When they are the same washing can generally be considered as complete.

When the wash step is completed the wet adsorbent particles will usually contain from about 30 to about 50 wt. % volatile matter (water) as measured by loss on ignition to 900° C. The remaining step in the method of manufacture then is the drying step in which the volatile content of the washed adsorbent is reduced to less than about 10 wt. % with the preferred volatile content being about 5 to 7 wt. %. Drying conditions include the presence of air and can include temperatures from about 100° F. to about 1000° F. The time required to achieve the desired volatile content will vary depending upon the drying temperature and the exact volatile content of the water-washed adsorbent particles to be dried.

The following example is presented to demonstrate the method of this invention and the improved properties of an adsorbent prepared by the method of this invention. The example is not intended to unduly limit the scope of the appended claims.

EXAMPLE

An adsorbent, containing type X zeolite and having improved capacity for olefins and acceptably low catalytic activity, was produced using the following procedure.

Nominal 1/16-inch type 13X extrudate, obtained from Union Carbide Linde Division, was ground to produce 16–40 U.S. Standard mesh particle size material having physical and chemical properties as shown in Table No. 3 shown below. Olefin capacity and catalytic activity were obtained using the testing apparatus and procedures previously described.

Table 3

Properties of the Starting Material

| Chemical Properties | |
|---|---|
| Volatile Matter (loss on ignition at 900° C.), wt. % | 3.2 |
| SiO₂ (volatile free) wt. % | 50.7 |
| Al₂O₃ (volatile free) wt. % | 33.6 |
| Na₂O (volatile free) wt. % | 12.4 |
| Na₂O/Al₂O₃ | .61 |
| SiO₂/Al₂O₃ | 2.56 |
| Physical Properties | |
| Apparent Bulk Density, gm/cc | 0.635 |
| Surface Area, M²/gm | 500 |
| Pore Volume, ml/gm | 0.30 |
| Pore Diameter, A | 24 |
| Area % faujasite (X-ray) | 93 |
| SiO₂/Al₂O₃ (X-ray) | 2.5 |
| Particle Size Distribution: | |
| Wt. % on 16 U.S. Screen | 0.3 |
| on 20 | 33.3 |
| on 30 | 37.9 |
| on 40 | 21.4 |
| on 56 | 6.1 |
| on 60 | 0.3 |
| through 60 U.S. Screen | 0.7 |
| Testing Data | |
| A₈, cc of octene-1/40cc adsorbent | 3.1 |
| A₁₀, cc of decene-1/40cc adsorbent | 2.8 |
| Catalytic Activity, Dimer Units | 55 |

One hundred pounds of the granular starting material was loaded into an ion exchange tower against an upward flow of 1.6 wt. % NaOH solution at a rate such that the effluent temperature did not exceed 145° F. After all of the material was loaded, the material was ion exchanged by passing the 1.6 wt. % NaOH solution upflow through the ion exchange tower at a liquid hourly space velocity of 1.5 and a temperature of 200 °F. until a total of 0.335 pounds of NaOH per pound of volatile-free starting material has been passed through the tower.

After the ion exchange the water wash step was begun. The ion exchanged material was water washed by passing treated water, having a pH of 10, upflow through the tower at 1.5 LHSV and 140°F. to a total of 1.3 gallons of water per pound of volatile free starting material.

The washed material was then dewatered, unloaded from the ion exchange tower, and dried in a forced air oven at 570° F. to a volatile content of 5.0 wt. %. An overall yield of 72% dried 16–40 U.S. mesh granular adsorbent was obtained by this procedure. Properties of the finished absorbent are shown in Table No. 4 below:

Table 4

| Properties of the Finished Adsorbent | |
|---|---|
| Chemical Properties | |
| Volatile Matter | |
| (loss on ignition at 900° C.) wt. % | 5.0 |
| $SiO_2$ (volatile free) wt. % | 48.0 |
| $Al_2O_3$ (volatile free) wt. % | 32.1 |
| $Na_2O$ (volatile free) wt. % | 15.8 |
| $Na_2O/Al_2O_3$ | 0.81 |
| $SiO_2/Al_2O_3$ | 2.54 |
| Physical Properties | |
| Apparent Bulk Density, gm/cc | 0.671 |
| Surface area, $M^2$/gm | 516 |
| Pore volume, ml/gm | 0.27 |
| Pore diameter, A | 21 |
| Area % faujasite (X-ray) | 110 |
| $SiO_2/Al_2O_3$ (X-ray) | 2.5 |
| Particle Size Distribution: | |
| Wt. % on 16 U.S. Screen | 0.0 |
| on 20 | 22.7 |
| on 30 | 37.1 |
| on 40 | 29.0 |
| on 56 | 8.2 |
| on 60 | 0.1 |
| through 60 U.S. Screen | 2.9 |
| Testing Data | |
| Olefin Capacity: | |
| $A_8$, cc of octene-1/40cc adsorbent | 3.78 |
| $A_{10}$, cc of decene-1/40cc adsorbent | 3.35 |
| Catalytic Activity, Dimer Units | 3.9 |

Testing results shown in Tables 3 and 4 show that by the method of this invention the adsorbent total capacity for olefins has been increased about 15% and as importantly the catalytic activity has been substantially decreased from 55 dimer units to an acceptable activity of 3.9 dimer units. $Na_2O$ content of the adsorbent has been increased about 25% from 12.4 wt. % to 15.8 wt. % with less about 15% reduction each in the $SiO_2$ and $Al_2O_3$ content.

We claim as our invention:

1. A method for the production of improved adsorbent particles comprising a sodium form X structured zeolite having increased adsorptive capacity for olefins and decreased catalytic activity from a precursor mass comprising an X structured zeolite and having a $Na_2O/Al_2O_3$ ratio less than about 0.7, which method comprises the steps of:
   a. contacting said precursor mass with an aqueous sodium hydroxide solution at ion exchange conditions to increase the sodium cation content to a $Na_2O/Al_2O_3$ ratio of greater than about 0.7 and to remove from about 1 to about 15 wt. % of silica and alumina from the precursor mass;
   b. washing said mass with water to remove therefrom excess sodium hydroxide; and,
   c. at least partially dehydrating said mass at dehydrating conditions.

2. The process of claim 1 further characterized in that said contacting is effected at a temperature within the range of from about 50° F. to about 300° F.

3. The process of claim 1 further characterized in that said ion exchange conditions include a temperature within the range of from about 50° F. to about 300° F. and a sodium hydroxide solution concentration of from about 0.5 to about 10 wt. % NaOH.

4. The process of claim 1 further characterized in that said ion exchange conditions include a temperature within the range of from about 150° to F. to about 250° F. and a sodium hydroxide solution concentration of from about 0.5 to 5 wt. %

5. The process of claim 1 further characterized in that said dehydration conditions include a temperature within the range of from about 100° F. to about 1000° F.

6. The process of claim 1 further characterized in that the wash water in step (b) is maintained at a pH within the range of 7 to 10.

* * * * *